United States Patent
Mika et al.

(10) Patent No.: US 6,258,276 B1
(45) Date of Patent: *Jul. 10, 2001

(54) MICROPOROUS MEMBRANES AND USES THEREOF

(75) Inventors: Alicja M. Mika, Hamilton; Ronald F. Childs, Dundas; James M. Dickson, Hamilton, all of (CA)

(73) Assignee: McMaster University, Hamilton (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/733,792

(22) Filed: Oct. 18, 1996

(51) Int. Cl.[7] .............................. B01D 61/14; B01D 61/58
(52) U.S. Cl. ........................ 210/638; 210/641; 210/651; 210/654
(58) Field of Search .................... 210/638, 651, 210/653, 654, 683, 684, 685, 641

(56) References Cited

U.S. PATENT DOCUMENTS

| | | | |
|---|---|---|---|
| 3,737,045 | * 6/1973 | Hashimoto | 210/490 |
| 3,944,485 | * 3/1976 | Rembaum | 210/638 |
| 4,006,069 | 2/1977 | Hiratsuka et al. | 204/180 |
| 4,014,798 | * 3/1977 | Rembaum | 210/500.28 |
| 4,045,352 | * 8/1977 | Rembaum | 210/500.28 |
| 4,083,768 | 4/1978 | Lee et al. | 204/296 |
| 4,187,333 | * 2/1980 | Rembaum | 210/500.28 |
| 4,357,220 | * 11/1982 | Eisenmann | 210/651 |
| 4,613,440 | * 9/1986 | Zupancic | 210/490 |
| 4,992,176 | * 2/1991 | Bartels | 210/640 |
| 5,049,275 | 9/1991 | Gillberg-Laforce et al. | 210/500.27 |
| 5,126,503 | * 6/1992 | Bartels | 585/818 |
| 5,147,549 | * 9/1992 | Chou | 210/640 |
| 5,152,898 | * 10/1992 | Bartels | 210/640 |
| 5,192,445 | * 3/1993 | Bartels | 210/640 |
| 5,281,337 | * 1/1994 | Chou | 210/654 |
| 5,456,839 | * 10/1995 | Chou | 210/638 |

FOREIGN PATENT DOCUMENTS

| | | | |
|---|---|---|---|
| 0 309 259 | 3/1989 | (EP) | 210/490 |
| 0 474 617 | 3/1992 | (EP) | 210/490 |
| 2688418 | 9/1993 | (FR) | 210/490 |
| WO 87 06395 | 10/1987 | (WO) | 210/490 |
| WO 91 10498 | 7/1991 | (WO) | 210/490 |
| WO 92 05595 | 4/1992 | (WO) | 210/490 |
| WO 97 17129 | 5/1997 | (WO) | 210/490 |

OTHER PUBLICATIONS

Mika, A New Class of Polyelectrolyte–filled Microfiltration Membranes, Journal of Membrane Science, 108 (1995) pp. 37–56.*

* cited by examiner

Primary Examiner—Ernest G. Therkorn
(74) Attorney, Agent, or Firm—Sim & McBurney

(57) ABSTRACT

Charged membranes comprise a porous substrate and a cross-linked polyelectrolyte or hydrogel located in the pores of the substrate and are useful in a variety of membrane separation processes, including pressure driven membrane separation, diffusion dialysis, Donnan dialysis, electrodialysis, electrochemical synthesis and prevaporation. Certain of the membranes are novel.

13 Claims, 1 Drawing Sheet

Pervaporation with Water/Ethanol Mixtures: Effect of Temperature — Separation

Pervaporation with Water/Ethanol Mixtures: Effect of Temperature — Flux

MICROPOROUS MEMBRANES AND USES THEREOF

FIELD OF INVENTION

The present invention relates to certain novel membranes and the novel uses of certain membranes.

BACKGROUND OF THE INVENTION

Membranes are used, for instance, in separation processes as selective barriers that allow certain chemical species to pass, i.e., the permeate, while retaining other chemical species, i.e., the retentate. Membranes are used in many applications, for example as biosensors, heparinized surfaces, facilitated transport membranes utilizing crown ethers and other carriers, targeted drug delivery systems including membrane-bound antigens, catalyst-containing membranes, treated surfaces, sharpened resolution chromatographic packing materials, narrow band optical absorbers, and in various water treatments which involve removal of a solute or contaminant, for example, dialysis, electrodialysis, microfiltration, ultrafiltration, reverse osmosis, nanofiltration and in electrolysis and in fuel cells and batteries.

There are a large number of supports or substrates for membranes. Specific physical and chemical characteristics to be considered when selecting a substrate include: porosity, surface area, permeability, solvent resistance, chemical stability, hydrophilicity, flexibility and mechanical integrity. Other characteristics may be important in certain applications.

In Mika et al., J. Membr. Sci., 108 (1995) pp 37 to 56, there is described a procedure for modifying microporous polypropylene and polyethylene membranes wherein 4-vinylpyridine is in situ polymerized into the pores of the membrane.

SUMMARY OF THE INVENTION

We have found that, by cross-linking the membranes described by Mika et al. with a suitable cross-linking agent, such as divinylbenzene (DVB), thee are provided charged membranes comprising porous microfiltration substrate membranes whose pores have located therein a cross-linked polyelectrolyte or hydrogel anchored to the substrate polymer, which exhibit novel effects in a variety of membrane applications.

In particular, the membranes exhibit significant ion rejection properties, enabling water softening to be effected, particularly at ultra-low pressure, such as the pressure of tap water, by removing multivalent ions, such as calcium and magnesium, in preference to monovalent ions, such as sodium.

The membranes further exhibit electrochemical separator properties which make them suitable for a wide variety of applications, including electrodialysis, battery separators, fuel cell separators and electrochemical synthesis.

In addition, the membrane may be used for Donnan dialysis, diffusion dialysis and pervaporation.

Accordingly, in one aspect of the present invention, there is provided an improvement in a membrane separation process selected from the group consisting of pressure driven membrane separation, diffusion dialysis, Donnan dialysis, electrodialysis, electrochemical synthesis and pervaporation, the improvement which comprises employing a charged membrane comprising a porous substrate and a cross-linked polyelectrolyte or hydrogel located in the pores of the substrate.

The polyelectrolyte or hydrogel may be found in the pores of the substrate by in situ polymerization of a monomer or a mixture of monomers with a cross-linking agent, the monomer or at least one of the monomer mixture being selected from those monomers which contain a functional group that provides an ion-exchange site and those which contain a group which is susceptible to a chemical reaction by which such functional groups are subsequently introduces to the in situ-formed polymer.

Alternatively, the polyelectrolyte or hydrogel may be formed in the pores of the substrate by, first, in situ polymerization of a monomer or a mixture of monomers, the monomer or at least one of the monomers of the monomer mixture being selected from those monomers which contain a functional group that provides an ion-exchange site and those which contain a group which is susceptible to a chemical reaction by which such functional groups are subsequently introduced to the in situ-formed polymer, and, subsequently, cross-linking the in situ-forming polymer.

The properties of the cross-linked polyelectrolyte or hydrogel located in the pores of the substrate, by covalent bonding to or cross-linked around structural elements of the porous substrate may be modified for specific applications by selection of the appropriate degree of cross-linking.

GENERAL DESCRIPTION OF INVENTION

Figure 1A:
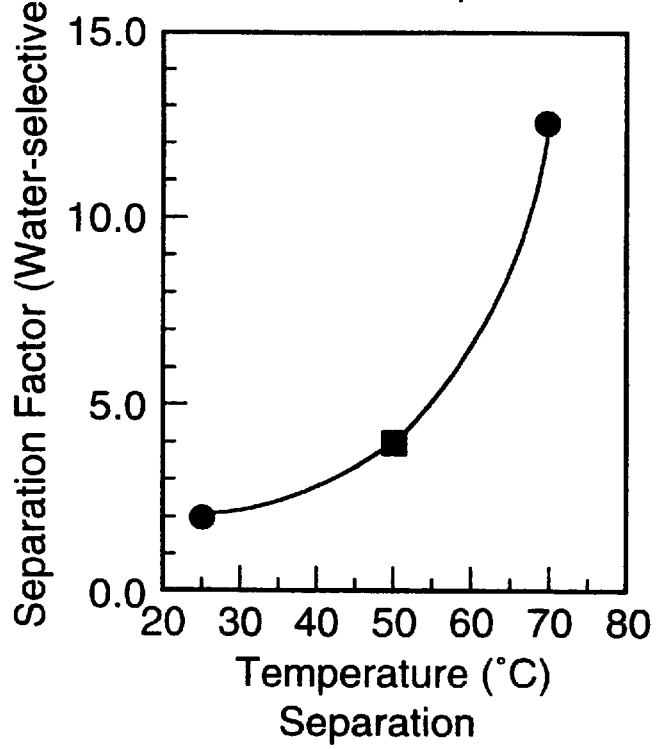
FIGURE 1, comprising graphs A and B, contains a graphical representation of the effects of temperature on pervaporation of water/ethanol mixture, as detailed in Example 7 below.

The porous microfiltration substrate which is modified to provide the charged membranes used herein may comprise a porous substrate formed of polymeric material, such as polypropylene or polyethylene, into the pores of which may be in situ polymerized and cross-linked polyelectrolytes or hydrogels anchored to the substrate polymer by other covalent bonding to or cross-linked around the structural elements of the porous substrate.

For porous substrates, the pore diameters may vary widely but preferably range from about 0.01 to about 20 microns, more preferably from about 0.1 to about 5 microns and particularly from about 0.2 to about 1.0 microns. Pore diameters for microporous substrate are measured by the bubble-point method according to ASTM F-316.

The porosity or pore volume of a polymeric porous substrate used herein is preferably from about 25 to about 95%, more preferably from about 45 to about 85% and particularly from about 60 to about 80%. Porosity can be derived from the value of the bulk density of the porous substrate and the polymer density of substrate polymer according to ASTM D-792.

The thickness of substrate will depend on the intended use of the membrane product. For many uses, for example microfiltration, thicknesses ranging from about 1 to about 100 microns, more preferably about 10 to about 240 microns and particularly about 20 to about 100 microns, would be suitable.

In situ polymerization of a suitable monomer to enable anchoring of polymeric molecules having ionizable groups may be effected by any convenient polymerization procedure, preferably by free-radical polymerization operation. Such free radical polymerization may include initiation of the polymerization by radiation initiation, thermal initiation or redox initiation. Typical initiators include benzoin ethers and benzoyl peroxide. The in situ polymerization may include graft polymerization.

Monomers which are suitable for such in situ polymerization include unsaturated derivatives containing a functional group that provides, or can be modified by a post-polymerization treatment to provide an ion-exchange site to permit formation of a polyelectrolyte or hydrogel. Suitable examples include 4-vinylpyridine, acrylic acid, methacrylic acid, styrene and vinylbenzyl chloride. The polymers so formed in the pores are non-extractable therefrom and hence anchored therein.

The cross-linking of the in-situ polymerized molecule to control or modulate conformational flexibility of such molecules may be effected by adding the cross-linking monomer to the in-situ polymerized monomer, so that the in-situ polymerization and cross-linking occur simultaneously. Alternatively, the cross-linking may be effected as a separate operation following the initial in-situ polymerization. The cross-linking which is formed may be covalent or ionic in nature and may be effected by radiation cross-linking.

The simultaneous in situ polymerization and cross-linking is preferred since the yield of the in-situ polymerization in terms of increase over the base weight of the substrate, is significantly increased thereby.

The cross-linking agent may be any suitable unsaturated molecule capable of reacting to produce cross-links in the in-situ polymerized molecules. The cross-linking agent may be a molecule containing at least two unsaturated moieties to permit the formation of cross-links. Examples of such monomers are divinylbenzene and divinylpyridine. Other examples of suitable cross-linking monomers are diacrylates, such as di(ethylene glycol) diacrylate, tetra (ethylene glycol) diacrylate of 1,6-hexanediol diacrylate.

The quantity of cross-linking monomer used depends on the membrane application and may vary up to about 20 wt % of the total weight of in situ polymerized monomer mixture. For water treatment under low pressure driven applications, the quantity of cross-linking monomer may run up to about 10%, preferably about 0.25 to about 5 wt %, more preferably from about 0.25 to about 1 wt % of total in situ polymerized monomer mixture.

The polyelectrolytes may be cross-linked after they have been formed in situ in the pores by a post-polymerization treatment. The cross-linking agent used in this type of post-polymerization cross-linking may be a molecule containing at lest two or more functional groups capable of reacting with functional groups or other active sites on the in situ formed polymer to form covalent bonds or ionic bonds. Examples of molecules forming covalent bonds are dialkylating reagents, such as 1,3-dibromopropane, diacylating and triacylating reagents, such as isophthaloyl and trimesoyl chlorides, respectively. Examples of ionic cross-linking include complexes formed between multivalent transition metal ions and carboxylic acid groups.

The amine type nitrogen atoms of incorporated polymers may be quaternized for certain applications, such as by alkylation, for example, with dimethyl sulphate, as well as alkyl halides, including arylalkyl halides.

Particular combinations of monomers for production of the cross-linked polyelectrolyte or hydrogel which may be employed include:

an in-situ formed copolymer of vinylpyridine and a monomer selected from divinyl benzene and divinylpyridine, an in-situ formed polyvinylpyridine which is subsequently cross-linked with an alkylating agent, such as 1,3-dibromo-propane, an in-situ copolymer of vinylbenzylchloride and divinylbenzene into which the ion-exchange functional groups are introduced by reaction with a tertiary amine, an in-situ formed copolymer of styrene and divinylbenzene into which the ion-exchange functional groups are introduced by sulfonation, an in-situ formed copolymer of acrylic acid or methacrylic acid and divinylbenzene, an in-situ formed copolymer of acrylic acid or methacrylic acid and a diacrylate.

Microporous polypropylene or polyethylene membranes which have in situ polymerized vinylpyridine and which are cross-linked with about 0.25 to about 1 wt % by weight of the total monomers by divinylbenzene are particularly useful in pressure driven water treatment, i.e. reverse osmosis or nanofiltration cations in preference to monovalent reject multivalent cations in preference to monovalent cations. By varying the degree of properties of the cross-linking, the membrane may be modified to be specific for specific applications. Such membranes are considered novel and constitute one aspect of the invention.

Ion Rejection:

The charged membranes, comprising a non-ionic, porous substrate having pores which are filled with a cross-linked polyelectrolyte bound to or around the structural elements of the substrate polymer, are capable of rejecting both inorganic and organic ions from water at pressures as low as 345 kPa (50 psig), a pressure which is within the range of tap water delivery pressure. Such preferential rejection is seen at even lower pressures down to 140 kPa (20 psig).

The rejection of salts containing monovalent cations, for example, $Na^+$, is subsequentially lower than rejection of salts with multivalent cations, for example, $Mg^{2+}$, $Ca^{2+}$. Charged organic materials, such as organic acids and salts, also are rejected by the membranes, while relatively large non-ionic organic molecules, such as sucrose, have low rejections by the membranes. The ability of the membranes to function at such ultra-low pressures and their distinctive pattern of separations distinguishes the membranes from other commercially-available nanofiltration or reverse osmosis membranes, which function only effectively at higher pressures.

Unlike commercial membranes, the pore-filled membranes provided herein exhibit quite a different dependence of the ratio of permeate flux with a salt solution as feed to permeate flux with pure water as feed on pressure. At low pressures, a 0% DVB cross-linked grafted material has a permeate to pure water flux which exceeds 1. This ratio decreases with increasing pressure due either changes in the membrane itself or concentration polarization. With a 1% cross-linking, the ratio at low pressure is reduced somewhat below 1 but is essentially pressure independent. With 4% cross-linking, the membrane starts to behave much more like a typical commercial thin-film composite membrane.

The ability of the membranes provided herein to effect ultra-low pressure ion-rejection has wide application of use in water treatment technology to soften water without removing most non-ionic organic matter from water. Such applications may range from domestic water softening operations to the removal of calcium from tap water supplied to air conditioning systems as well as to water softening applications generally.

Existing commercial membranes used for water softening are limited by an excessive and indiscriminate rejection of all dissolved species and this is particularly true with thin-film composite membranes, commercial examples being low-pressure nanofiltration membranes available from FilmTec and Fluid Systems. Other nanofiltration membranes which have been developed specifically for removal of organic materials from water, generally humic acid derivatives, exhibit a low removal or ions, including calcium. The recommended operating pressures for commercially available low pressure nanofiltration membranes are higher than those found to be sufficient for the invented membranes.

Diffusion Dialysis

The technologies currently employed for treating waste acid streams generally involve neutralization and solid waste disposal. The costs of such a disposal routine are increasing rapidly and environmental concerns and the value of recovering of a variety of metal ions, for example, chromium, are strong incentives for treatment of these waste streams.

The charged membranes provided herein are useful in diffusion dialysis of solutions containing mineral acids and metal salts to separate the salts from the acids, with the acids being transported through the membranes at high rates while the salts are rejected by the membranes. The degree of cross-linking employed in the membranes used in diffusion dialysis is generally greater than for pressure driven processes. The permeability of the membrane to protons is not much affected by cross-linking, up to a certain level. However, water permeability and metal ion permeability are affected. The membranes are also suitable for separating acids from neutral organic compounds under diffusion dialysis conditions.

Diffusion dialysis with the charged membranes can be used for the recovery of acid and stabilization of electrolyte composition in a number of industrial processes, such as in the almite process, in aluminum capacitor etching, purification and metal salt recovery in non-ferrous smelting and refining, stabilization of electrolytic etching in secondary processing of iron and pickling solutions in secondary processing of iron and steel, and in purification of industrial acids, such as sulfuric acid and hydrochloric acid.

Electrochemical and Related Processes and Uses of Charged Membranes

Charged membranes are used in a wide variety of electrochemical applications including electrodialysis, electrolysis, fuel cells and battery separators. A key feature of membranes for these applications are high ion-exchange capacities, low water transport, low electrical resistance, and good selectivity in terms of the transport of ions of different charge type (cations versus anions).

The charged membranes provided herein are useful in the applications, such as electrodialysis, electrochemical processes, fuel cells and batteries. In particular, they have very high ion-exchange capacities, exceeding 4 milliequivalents per gram, and very low electrical resistances. The measured resistances are independent of cross-linking degree at least for the range of about 1 up to about 5 wt. %, thereby allowing control over water permeability by using more highly cross-linked polyelectrolytes within the pores. Such membranes constitute a further aspect of the invention.

Pervaporation

Pervaporation is a process in which a liquid feed solution is placed in contact with a membrane on the other side of which is a vapor phase. Generally, the vapor phase is held at a partial vacuum. Components in the liquid phase are transported through the membrane, evaporate on the vapor side of the membrane and are subsequently condensed for recovery. Selectively in separation of the components in the feed is achieved by the proper choice of membrane material. Pervaporation is widely used in the final dehydration of ethanol.

The membranes provided herein are useful in pervaporation processes showing very high overall fluxes and good separations. They can be used, for example, in the purification of ethanol/water streams.

EXAMPLES

In the specific Examples which follow, polypropylene (PP) or polyethylene (PE) microporous substrates were used which had an average pore diameter of about 0.2 $\mu$m, a thickness of about 50 $\mu$m and a porosity of about 65 to 70 volume percent. Such polypropylene substrates were made following the procedure described in U.S. Pat. No. 4,539,265 (Shipman), the disclosure of such United States patents being incorporated herein by reference.

Example 1

This Example illustrates the preparation of membranes.

The PP and PE substrates were subjected to in situ polymerization of 4-vinylpyridine (4VP) with varying amounts of divinylvenzene (DVB). Divinylbenzene of technical grade containing 55% of a mixture of monomers, was purchased from Aldrich Chemical Company, St. Louis, Mo. and was initially purified by vacuum distillation. All reagents employed in the membrane preparations described herein were purchased from Aldrich Chemical Company.

A. Thermally-Initiated in Situ Polymerization:

In thermally-initiated in situ polymerization from the vapor phase, the porous PP of PE substrate was coated with benzoyl peroxide (BPO) by immersing it in an acetone solution containing 1% BPO and 1% poly(vinyl acetate) for 5 to 10 minutes and subsequent drying it in air. The coated substrate was suspended inside a glass reactor containing on its bottom 2 to 3 mL of a vinylpyridine/DVB mixture. After the pressure inside the reactor had been reduced below 10 mmHg, the reactor was heated to 80° C. for half an hour to effect the polymerization.

B. Photo-Initiated in Situ Polymerization:

In photo-initiated in situ polymerization from solution, the porous PP or PE substrate was wetted with vinylpyridine, DVB and 1 to 1.5% of benzoin ethyl ether as a photo-initiator. The wetted substrate was degassed in a freeze-thaw cycle and irradiated using light of wavelength 350 nm for 30 minutes.

In each such procedure, unbound homopolymer was removed from the membranes by extraction with boiling methanol until no further mass loss occurred.

C. Quaternization:

Quaternization of amine groups in the in situ formed cross-linked polymer was effected by immersing the membrane into a solution containing 5 to 10% by volume of dimethyl sulfate in methanol at room temperature for 16 to 24 hours followed by subsequent thorough wash of the membrane with methanol and, finally, with deionized water.

D. Cross-Linking with 1,3-Dibromopropane:

Quaternization and cross-linking of amine groups in the in situ formed cross-linked polymer was effected with 1,3-dibromopropane carried out using a solution that contained 0.05 mol of 1,3-dibromopropane per 1 mol of pyridine nitrogen in the membrane dissolved in 100 to 150 mL of methanol. The membrane was placed in the solution and heated under reflux for 70 hours.

Example 2

This example shows the water softening capability of the membranes prepared as described in Example 1, in comparison to known membranes, as described in Fu et al., Journal AWWA, 86, 55 to 72 (1994).

A. Commercially-Available Membranes:

Four commercially-available thin-film composite membranes were tested for their ability to reject organic and inorganic components. Table I provides the chemical and physical characteristics of the membranes while Table II provides the performance data.

TABLE I

Characteristics of thin-film composite (TFC) nanofiltration membranes

| Membrane | Material | Rated Operating Pressure kPa (psig) | Flux at Rated Pressure L/m²h (gpd/sq ft) | Permeability L/m²h kPa (gpd/sq ft psig) |
|---|---|---|---|---|
| NF70[1] | modified aromatic polyamide | 483 (70) | 37 (22) | 0.118 (0.48) |
| TFCS[2] | modified aromatic polyamide | 522 (80) | 26 (15) | 0.049 (0.20) |
| NTR7450[3] | sulfonated polyether sulfone | 986 (143) | 93 (55) | 0.106 (0.43) |
| NTR7410[3] | sulfonated polyether sulfone | 986 (143) | 496 (292) | 0.185 (0.75) |

[1] FilmTec, Minneapolis, Minn.
[2] Fluid Systems, San Diego, CA.
[3] Nitto Denko from Hydranautics, San Diego, CA.

TABLE II

Rejection (%) of organics and inorganics by TFC nanofiltration membranes

| Membranes | Color | TOC | Conductivity | Alkalinity | Calcium |
|---|---|---|---|---|---|
| NF70 | >97.5 | 94 | 90 | 93 | 98.5 |
| TFCS | >97.5 | 96 | 92 | 94 | 98.5 |
| NTR7450 | >97.5 | 93 | 30 | 32 | 35.0 |
| NTR7410 | 97.0 | 86 | 10 | 5 | N/A |

B. Membranes of Example 1:

(a) A membrane prepared as described in Example 1 by the photo-initiated in-situ polymerization procedure was tested for its water softening ability on untreated tap water alone or in combination with organic materials at a flux of 2.52 L/M²h at 345 kPa. The membrane was a polypropylene base membrane in situ polymerized with 4-vinylpyridine containing 1.2% divinylbenzene. This membrane was subsequently quaternized by treatment with dimethyl sulphate as described in Example 1. The results obtained for individual runs of approximately 24 hours, which were reproducible over long term testing, are set forth in the following Table III:

TABLE III

| | RUN 1[1] | | RUN 2[2] | | RUN 3[3] | |
|---|---|---|---|---|---|---|
| COMPONENT | Feed, ppm | Rejection, % | Feed, ppm | Rejection, % | Feed, ppm | Rejection % |
| Sodium | 19.5 | 71.3 | 13.3 | 38.8 | 13.3 | 60.0 |
| Magnesium | 12.0 | 97.4 | 10.4 | 58.6 | 8.9 | 91.0 |
| Calcium | 49.8 | 92.6 | 41.9 | 57.1 | 36.4 | 82.1 |
| Acetate | | | 115.8 | 48.2 | | |
| Chloride | | | 16.9 | 51.0 | | |
| Sulfate | | | UD[4] | 99.5+ | | |
| Sucrose | | | | | 558.4 | 12.9 |

Notes: [1] Run 1 = Tap water
[2] Run 2 = Tap water + 100 ppm acetic acid
[3] Run 3 = Tap water + 550 ppm sucrose
[4] UD = undetectable due to precipitation of $CaSO_4$ at increased concentrations of $Ca^{2+}$ in the feed.

As may be seen from these data, the charged membranes effected water softening since they remove calcium and other bivalent ions to a much larger extent than sodium ions. The results also show that the membranes are able to remove charged organics (acetate).

Operation at 50 psig permits the membranes to be driven directly from a municipal water supply, with no pretreatment and with no additional pressurization being required and at pressures significantly lower than the commercially-available membranes shown in Table 1 and 2.

(b) Two different membranes prepared as described in Example 1 by the thermally-initiated vapor phase in situ polymerization (membrane A) and the photochemical in situ polymerization method (Membrane B) were tested for their water-softening ability on untreated tap water. Membrane A was a polypropylene membrane in situ polymerized with 4-vinylpyridine containing 1.1 wt % of divinylbenzene. This membrane was subsequently quaternized by treatment with dimethyl sulphate as described in Example 1. Membrane B was a polypropylene membrane in situ polymerized with 4-vinylpyridine containing 1.2 wt % divinylbenzene. This membrane was subsequently quaternized by treatment with dimethyl sulphate as described in Example 1 (same membrane as Example 2(B)(a)).

The results are set forth in the following Table IV:

TABLE IV

| Ion | Feed ppm | Membrane A Rejection % 345 kPa (50 psi) | Membrane A Rejection % 140 kPa (20 psi) | Membrane B Rejection % 345 kPa (50 psi) |
|---|---|---|---|---|
| Sodium | 23.3 | 45.9 | 12.7 | 63.6 |
| Magnesium | 22.4 | 82.1 | 61.6 | 90.8 |
| Calcium | 85.5 | 66.4 | 29.7 | 88.4 |
| Chloride | 44.8 | 68.5 | 31.1 | 77.0 |
| Sulphate | 13.4 | 89.6 | 56.0 | >99.5 |
| Flux (L/m²h) | | 5.76 | 2.12 | 2.52 |

These results show that substantial water softening is achieved at conventional tap pressures and that a pressure as low as 20 psi still provided substantial water softening.

Example 3

This Example illustrates the flux and rejection of cations from tap water using the membranes prepared as described in Example 1.

Several different membranes, prepared following both the thermally-initiated and photoinitiated in situ polymerization procedures of Example 1, were tested for their flux and ability to reject cations from tap water under a pressure of 345 kPa (50 psi). The results obtained are summarized in the following Table V:

TABLE V

Membrane Characteristics

| No. | Substrate | % DVB | Mass Gain, % | Flux kg/m²h | Rejection, % Na | Mg | Ca |
|---|---|---|---|---|---|---|---|
| Membranes prepared by photoinitiated polymerization ||||||||
| 1 | PP | 3.0 | 212.4 | 1.0–1.7[a] | 51 | 68 | 56 |
| 2 | PP | 1.2 | 147.0 | 2.3 | 71 | 97 | 93 |
| 3 | PP | 0.5 | 60.5 | 4.1 | 40 | 65 | 59 |
| 4 | PP | 0.5 | 131.6 | 2.5 | 67 | 82 | 80 |
| 5 | PP | 0.3 | 124.7 | 4.1 | 47 | 60 | 60 |
| 6 | PE | 0.3 | 209.8 | 3.8 | 53 | 83 | 77 |
| 7 | PE | 0.00 | 67.5 | 11.5 | 6 | 8 | 8 |
| Membranes prepared by thermally-initiated vapour-phase polymerization ||||||||
| 10 | PP | 1.0 | 350.9 | 5.5 | 62 | 85 | 80 |

Notes:
[a]obtained with two samples prepared under identical conditions; measured under 1000 kPa and extrapolated to 345 kPa (50 psi)

As may be seen from the results set forth in the above Table V, membranes produced by photoinitiated polymerization exhibit several characteristics. By comparing experiments 3 and 4, it can be seen that the flux decreases with mass gain. Flux also decreases with increasing levels of cross-linking monomer (experiments 4 and 5). The separation level generally increases with increasing levels of cross-linking monomer. A trade-off exists among cross-linking, flux and separation. This relationship leads to the conclusion that about 0.25 to about 1 wt % is the degree of cross-linking monomer desired for ultra low pressure water softening. The polyethylene substrate produced membranes with higher fluxes than the polypropylene substrate for the same level of cross-linking and had a higher mass gain.

Example 4

This Example illustrates the use of the membranes for diffusion dialysis.

A membrane prepared as described in Example 1 comprising a polypropylene substrate having poly(4-vinylpyridine) (P4VP) and 3.3% DVB copolymerized in the pores thereof, was tested for diffusion dialysis of hydrochloric acid and sodium chloride in comparison to a commercially-available diffusion dialysis membrane Selemion DSV of AMV.

The results appear in the following Table VI:

TABLE VI

| Membrane | Concentr. of Acid mol/L | Concentr. of Salt mol/L | Permeability, U, mol/(m²h (mol/L)) HCl | NaCl | $U_{HCl}/UN_{NaCl}$ |
|---|---|---|---|---|---|
| Selemion DSV or AMV | 0.1 | 0.05 | 1.1 | 0.025 | 44 |
| Example 1 | 0.1 | 0.05 | 14.0 | 1.4 | 10 |

Selemion DSV is a commercially available diffusion dialysis membrane, one of the few on the market. As can clearly be seen from Table VI, the permeability for the membranes provided herein is nearly 1.4 orders of magnitude larger than that of the DSV membrane. The selectivity is poorer by a factor of 4 for the membrane provided herein.

Example 5

This Example illustrates the effect of changing the degree of cross linking introduced in the in situ polymerization as well as post-polymerization cross-linking with 1,3-dibromopropane of diffusion dialysis.

Membranes were prepared as in Example 1. The membrane listed as Membrane D in the following Table VIIIX was the same as Membrane C except for a post-polymerization treatment with 1,3-dibromopropane. Both membranes C and D has a polypropylene substrate with P4VP and 0.3% DVB in situ copolymerized in the pores thereof. Membranes E and F had 1.1% and 2.2% DVB cross-linking.

The membranes C, D, E and F were tested for diffusion dialysis with hydrochloric acid and sodium chloride in a flow cell. The membranes C, D. E and F provided herein were compared with the commercially available Selemion AMV membrane. The results obtained are set forth in the following Table VII:

TABLE VII

| Membrane | Concentr. of Acid mol/L | Concentr. of Salt mol/L | Permeability, U, mol(m²h (mol/L)) HCl | NaCl | $U_{HCl}/U_{NaCl}$ |
|---|---|---|---|---|---|
| Selemion DSV or AMV | 1.0 | 0.5 | 4.3 | 0.07 | 61 |
| Membrane C | 1.0 | 0.5 | 58 | 14 | 4 |
| Membrane D | 1.0 | 0.5 | 104 | 13 | 8 |
| Membrane E | 1.0 | 0.5 | 60 | 7 | 9 |
| Membrane F | 1.0 | 0.5 | 80 | 8 | 10 |

The data shown in Table VII show that increased cross-linking (up to 2.2% of cross-linker) with DVB gives membranes with higher acid permeabilities with increased selectivity. The additional cross-linking with dibromopropane provides a membrane with superior properties.

Example 6

This Example provides the membrane electrical resistance of certain of the membranes provided herein.

The electrical properties of membranes prepared following the procedures of Example 1 were determined for various levels of cross-linking and compared with those of two commercial cation and anion exchange membranes, respectively Selemion CMV and AMV.

The results are contained in the following Table VIII:

TABLE VIII

| Membrane Crosslinking % | Mass Gain % weight | Thickness μm | IBC meq/g | R/Ω (Cell) |
|---|---|---|---|---|
| 4.5 | 195 | 90 | 3.01 | 0.02 |
| 3.4 | 186 | 117 | 3.16 | 0.03 |
| 2.2 | 251 | 126 | 3.26 | 0.03 |
| 1.1 | 170 | 109 | 3.18 | 0.04 |
| Nascent | | 51.1 | | |
| Selemion CMV | | 150 | ca 1.5 | 0.18 |
| Selemion AMV | | 150 | ca 1.5 | 0.36 |

As may be seen from the above Table, the electrical resistance of the membrane is very low. The resistance of the membrane is, within the error limits of the measurements, independent of the degree of cross-linking. As water permeability decreases with increased cross-linking, it appears that membranes optimized for electrodialysis will have relatively high cross-linker ratios, since water transport is unwanted in electrodialysis and many other electrochemical operations.

Transference numbers ($t_+$ and $t_-$) of the membrane having 4.5% DVB cross-linked therein are compared with the Selenium AMV in the following Table IX:

TABLE IX

| | $t_+$ | $t_-$ |
|---|---|---|
| 4.5% DVB Membrane | <0.2 | >0.8 |
| Selemion AMV | <0.06 | >0.94 |

The high $t_-$ and low $t_+$ values for the membrane containing 4.5% DVB implies that the membrane exchanges anions and rejects cations to a large degree, which is borne out by the water softening data contained in Example 2.

Example 7

The Example shows the use of the membranes for pervaporation.

Figure 1B:
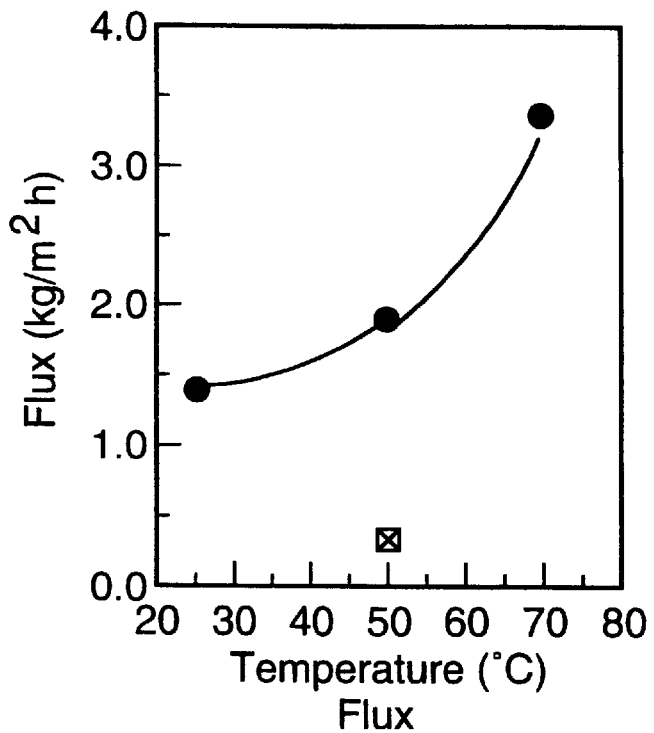

Using a membrane prepared as described in Example 1 containing 4.5% DVB, the pervaporation properties were measured using an aqueous solution of ethanol containing 4% ethanol. The effect of temperature on separation factor (i.e. water selective) and flux were determined and plotted graphically. These data appear in FIG. 1. As seen in graph A, the separation factor increased with temperature. As seen in graph B, the flux also increased with temperature.

The effect of ethanol concentration was also tested. The results obtained are shown in the following Table X:

TABLE X

| Feed Solution | Temperature ° C. | Flux (kg/m²h) | Separation Factor |
|---|---|---|---|
| 4 wt % ethanol | 50 | 0.3 | 4 |
| 85 wt % ethanol | 50 | 2.4 | 11 |

Based on the results seen in Table X, it can be concluded that the membrane is water selective.

SUMMARY OF THE DISCLOSURE

In summary of this disclosure, the present invention provides membranes having unique properties in a variety of applications. Modifications are possible within the scope of this invention.

What we claim is:

1. In a membrane separation process for water softening selected from the group consisting of pressure driven membrane separation, diffusion dialysis, Donnan dialysis and electrodialysis,, the improvement which comprises employing a charged membrane which preferentially rejects multivalent ions over monovalent ions and suitable for operation at ultra-low pressure, said charged membrane comprising a porous substrate and a cross-linked polyelectrolyte or hydrogel located in the pores of the substrate.

2. The process of claim 1 wherein said membrane separation process comprises a pressure-driven membrane separation to effect selective removal of multivalent cations from an aqueous medium containing monovalent cations and multivalent cations.

3. The process of claim 2 which is effected at a pressure of 70 psig.

4. The process of claim 3 wherein said membrane comprises a microporous substrate in the pores of which is in situ polymerized vinylpyridine combined with about 0.25 to about 1 wt. % of total monomers by divinylbenzene.

5. The process of claim 4 wherein amine groups in the polyelectrolyte are quaternized.

6. The process of claim 1 wherein the polyelectrolyte or hydrogel is formed in the pores of the substrate by in situ polymerization of a monomer or a mixture of monomers with a cross-linking agent, the monomer or at least one of the monomers of the monomer mixture being selected from those monomers which contain a functional group that provides an ion-exchange site and those which contain a group which is susceptible to a reaction by which such functional groups are subsequently introduced to in situ-formed polymer.

7. The process of claim 1 wherein the polyelectrolyte or hydrogel is formed in the pores of substrate by, first, in situ polymerization of a monomer or a mixture of monomers, the monomer or at least one of the monomers of the monomer mixture being selected from those monomers which contain a functional group that provides an ion-exchange site and those which contain a group which is susceptible to a chemical reaction by which such functional groups are subsequently introduced to the in situ-formed polymer, and, subsequently, cross-linking in situ-formed polymer.

8. The process of claim 1 wherein the polyelectrolyte is a copolymer of vinylpyridine and a monomer selected from divinylbenzene and divinylpyridine.

9. The process of claim 8 wherein the polyvinylpyridine is quaternized with an alkyl or aryl substituted alkyl halide or sulphate.

10. The process of claim 1 wherein the substrate is a microporous polyolefin substrate.

11. The process of claim 10 wherein the polyolefin is polypropylene or polyethylene.

12. The process of claim 1 wherein the properties of the bound polyelectrolyte or hydrogel are modified for a specific membrane and separation process by selection of the degree and type of cross-linking of the polyelectrolyte or hydrogel.

13. The process of claim 1 wherein said porous substrate is a microporous polypropylene substrate and said polyelectrolyte or hydrogel located in the pores of the microporous polypropylene substrate is poly(4-vinylpyridine) cross-linked with divinylbenzene and N-methylated with dimethyl sulfate.

* * * * *